2,860,152
METHOD OF PRODUCING CYCLIC DIORGANOSILOXANES

Herbert J. Fletcher, Midland, Mich., assignor to Dow Corning Corporation, Midland, Mich., a corporation of Michigan No Drawing. Application April 26, 1956
Serial No. 580,708

1 Claim. (Cl. 260—448.2)

This invention involves an improved method of preparing cyclic diorganosiloxanes by cracking organosilicon compounds with alkali.

United States Patent 2,455,999 teaches a method of preparing cyclic diorganosiloxanes by heating polyorganosiloxanes with alkali metal hydroxides. This method has met with considerable commercial success but it suffers from the disadvantage that in most cases gels are formed in the cracking vessel due to the accumulation of monoorganosiloxanes. These monoorganosiloxanes may have been in the original siloxane polymer or may be formed during cracking by thermal degradation or chemical cleavage of the organic groups on the silicon. In any event, in almost all cases where a considerable amount of organosiloxanes are cracked to produce the cyclic materials, gels form in the reaction vessel. Continued extreme heating will cause the gels to disintegrate as shown in the aforesaid patent. However, whereas the disintegration of the gel is satisfactory for laboratory operations it is not satisfactory in commercial operations. This is due to the fact that the formation of gels in the reaction vessel decreases the heat transfer within the reaction zone thereby causing considerable difficulty and increased expense.

Furthermore, the formation of gels often causes bumping in the cracking vessel. This bumping results in carry over of undesirable products along with the volatile cyclics. It may also cause the carry over of some of the alkaline catalyst into the condensers and other parts of the apparatus. The catalyst then polymerizes the cyclics to gums and gels which plug the condensers and generally interfere with the collection of the desired product.

Another effect of the formation of gels with the subsequent loss of heat transfer is the creation of hot spots in the reaction vessel thereby causing undesirable degradation of the organic units on the silicon, especially when the siloxane contains relatively unstable groups such as vinyl, allyl, ethyl, etc. This results in low yields of the desired diorgano cyclic siloxanes. It also lowers the efficiency and raises the cost of the operation.

It is the primary object of this invention to provide a new method of preparing diorgano cyclic siloxanes which gives improved yields, better efficiency of operation and lower costs than the heretofore employed methods. Another object is to provide an improved method for the preparation of cocyclic diorganosiloxanes (that is cyclics containing more than one type of diorganosiloxane unit). Another object is to provide an improved method of preparing cyclic trisiloxanes. Other objects and advantages will be apparent from the following description.

This invention relates to a method of producing cyclic diorganosiloxanes having a composition different from the starting siloxane which comprises heating a mixture of said starting diorganosiloxane and an inert solvent boiling above 250° C. in amount of at least 20% by weight based upon the weight of the siloxane, in the presence of an alkaline catalyst of the group alkali metal hydroxides and alkali metal salts of silanols under conditions of temperature and pressure insufficient to cause distillation of the solvent while simultaneously removing the desired cyclic diorganosiloxanes from the reaction zone.

The method of this invention can be carried out with any diorganosiloxane which produces cyclic materials which boil below the boiling point of the solvent employed. In general these consist of di-lower aliphatic hydrocarbon or di-lower aliphatic halogenated hydrocarbon substituted siloxanes and monocyclicaryl-lower aliphatic hydrocarbon or halogenated monocyclicaryl-lower aliphatic hydrocarbon substituted siloxanes. Lower aliphatic radicals contain less than 6 carbon atoms. Specific examples of siloxanes which are operative herein are dimethylsiloxane, diethylsiloxane, methylvinylsiloxane, allylmethylsiloxane, phenylmethylsiloxane, phenylethylsiloxane, trifluoropropylmethylsiloxane and trifluorotolylmethylsiloxane.

The starting siloxane can be either cyclic or linear and of any desired molecular weight. It can also be composed of a mixture or copolymer of two or more cyclic or linear siloxanes. Thus, the starting siloxane can range from thin fluids to non-flowing soluble gums.

The method of this invention lends itself particularly well to the preparation of cyclic trisiloxanes. These materials are prepared in good yields when the reaction is carried out under conditions of temperature and pressure so that the cyclic trisiloxanes are removed from the reaction zone while any volatile siloxanes having a higher degree of polymerization are returned thereto. By this method it is possible to quantitatively convert a cyclotetrasiloxane or higher cyclic to a cyclotrisiloxane.

The process of this invention is also particularly useful in the preparation in good yields of cocyclic siloxanes. The yield of such cocyclics obtained by the method of this invention is much higher than that obtained by the methods described in the aforesaid patent and by cohydrolysis of the corresponding chlorosilanes. For example, the cyclic monophenylheptamethylcyclotetrasiloxane is prepared in excellent yield by heating a mixture of tetraphenyltetramethylcyclotetrasiloxane and octamethylcyclotetrasiloxane in the procedure of this invention.

Any relatively thermally stable organic material which is inert to alkali and to the siloxanes can be employed in the method of this invention. Suitable solvents include hydrocarbons such as high boiling petroleum oil, polynuclear aromatic hydrocarbons such as diphenyl, anthracene, cyclohexylbenzene and the like; chlorinated aromatic hydrocarbons such as chlorinated biphenyl and aromatic ethers such as diphenyl ether, biphenyl ether and the like. It should be understood that a mixture of two or more suitable solvents may be employed in order to produce solvents of lower melting point. It is not essential that the solvent be liquid at room temperature but only that it be liquid at reaction temperature. The solvent and the siloxane need not be miscible in all proportions but should be sufficiently compatible to maintain the reaction mixture in a liquid state.

In order for the solvent to function satisfactorily it should be present in amount of at least 20% by weight of the siloxane. The upper limit of the amount of solvent is not critical. The preferred amount of solvent is from 25 to 60% by weight of the siloxane.

There is no critical temperature or pressure limitations for the method of this invention except that the temperature and pressure employed during the reaction should be insufficient to distill the solvent but sufficiently high to remove the desired product. Also the temperature should be insufficient to cause thermal degradation of the solvent or of the organic groups on the siloxane. In general the reaction of this invention can be carried out at temperatures ranging from 50° C. to 250° C. The pressure can be adjusted according to the temperature to produce the desired result. Ideally the temperature employed should not be higher than that required to distill the desired products from the reaction zone.

The catalysts employed in the method of this invention are the standard catalysts used in the cracking of siloxanes. The catalysts can be added either in the form of an alkali metal hydroxide or an alkali metal salt of a silanol. These silanol salts can be those having 1, 2 or 3 organic groups on the silicon, preferably the silanol salts are the alkali metal salts of diorganosilanols.

Specific examples of catalysts are lithium hydroxide, sodium hydroxide, potassium hydroxide, caesium hydroxide, the potassium salt of trimethylsilanol, the sodium salt of monomethylsiloxane, the lithium salt of dimethylsiloxane, and the caesium salt of phenylmethylsiloxane.

The method of this invention lends itself to either continuous or discontinuous operation. In a batch operation the solvent, siloxane and catalyst are charged into a reactor and thereafter heated at the temperature and pressure necessary to cause the desired cyclic siloxanes to distill from the reaction vessel. These conditions are maintained until all of the cyclic siloxane has been removed.

Alternatively the reaction may be carried out continuously by charging the mixture of the solvent, siloxane and catalyst into a reaction vessel, bringing the vessel up to reaction temperature and thereby continuously adding fresh siloxane to the reaction zone while simultaneously continuously removing the desired cyclics from that zone.

It should be understood that the desired cyclics may be a single species or a mixture of species. In the case of a mixture the product can be further separated by fractional distillation.

The cyclic siloxanes which are prepared in accordance with this invention are useful in the preparation of siloxane elastomers, fluids and resins.

The following examples are illustrative only and should not be construed as limiting the invention which is properly delineated in the appended claim.

*Example 1*

707.5 g. of octamethylcyclotetrasiloxane, 247 g. of a solvent comprising a mixture of about 75% diphenylether and 25% biphenyl and .6 g. of the salt $$KO(Me_2SiO)_3K$$

were charged into a reaction vessel and the mixture was heated at a temperature of 226° to 253° C. at atmospheric pressure. The reaction vessel was provided with a fractionating column, the head of which was maintained at 134 to 150° C. throughout the reaction. By this method hexamethylcyclotrisiloxane was continuously removed from the reaction zone while octamethylcyclotetrasiloxane which escaped from the reaction vessel was returned thereto. At the end of 21 hours the yield of the cyclic trimer was 66.5%. This compares with the yield of 4% cyclic trimer when dimethylsiloxane is cracked by the ordinary commercial method which is similar to that described in the aforesaid patent.

*Example 2*

This example shows a continuous operation of the method of this invention.

31 lbs. of the solvent of Example 1, 52 lbs. of octamethylcyclotetrasiloxane, .242 lb. of the potassium salt of Example 1 were placed in a reaction vessel. The mixture was heated at 230° C. Hexamethylcyclotrisiloxane was continuously removed from the reaction zone at a head temperature of 136° C. while more octamethylcyclotetrasiloxane was continuously fed into the reaction zone. Throughout the process the ratio in the reaction zone was about 40% solvent to 60% siloxane. The process was operated in this manner for 2½ weeks. The overall yield of hexamethylcyclotrisiloxane was 98%.

*Example 3*

A mixture of 344 g. of tetramethyltetravinylcyclotetrasiloxane, 296 g. of octamethylcyclotetrasiloxane, 640 g. of the solvent of Example 1 and 3.4 g. of the catalyst of Example 1 was placed in a reaction vessel. The mixture was heated at 130° C. for 9 hours at a pressure of 14–20 mm. while the volatiles were continuously removed at a head temperature of 80 to 100° C.

The distillate was then fractionated to give 19.2% by weight monovinylheptamethylcyclotetrasiloxane and 44.8% by weight divinylhexamethylcyclotetrasiloxane based on the weight of the distillate or 16.9% and 39.4% respectively based on the weight of the initial charge of siloxane.

In none of the above examples was there any gel formed in the reaction vessel.

*Example 4*

Results equivalent to those of Example 3 are obtained when an equimolar mixture of tetraphenyltetramethylcyclotetrasiloxane and octamethylcyclotetrasiloxane is employed in the method of that example.

*Example 5*

Excellent yields of tris-trifluoropropyltrimethylcyclotrisiloxane are obtained when higher polymeric trifluoropropylmethylsiloxanes

$$(CF_3CH_2CH_2\overset{Me}{Si}O)_x$$

are mixed with the solvent of Example 1 and with .1% by weight of sodium hydroxide based on the weight of the siloxane and the mixture thereafter heated at a pot temperature of 150° C. at 16 mm. while the head temperature is maintained between 75 and 76° C. and the tris-trifluoropropyltrimethylcyclotrisiloxane is continuously removed from the reaction zone.

That which is claimed is:

The method of producing cyclic diorganosiloxanes having a composition different from the starting siloxane and a boiling point below that of the starting siloxane which comprises heating together (a) a diorganosiloxane in which the organic radicals are selected from the group consisting of aliphatic monovalent hydrocarbon radicals of less than 6 carbon atoms, aliphatic monovalent halogenohydrocarbon radicals of less than 6 carbon atoms, monocyclic aryl radicals and monocyclic halogenoaryl radicals and in which there is at least one of said aliphatic radicals per silicon atom and (b) an inert solvent boiling above 250° C., said solvent being present in amount of at least 20 percent by weight based on the weight of the siloxane, in the presence of a catalyst selected from the group consisting of alkali metal hydroxides and alkali metal salts of silanols, under conditions of temperature and pressure insufficient to cause distillation of the solvent, while simultaneously removing the desired cyclic siloxanes from the reaction zone.

References Cited in the file of this patent

UNITED STATES PATENTS

| | | |
|---|---|---|
| 2,443,353 | Hyde et al. | June 15, 1948 |
| 2,490,357 | Hyde | Dec. 6, 1949 |